Oct. 12, 1926.

P. W. MEINECKE

PICTURE PROJECTION APPARATUS

Filed Feb. 3, 1926

WITNESSES

INVENTOR
Peter W. Meinecke
BY
ATTORNEYS

Oct. 12, 1926.
P. W. MEINECKE
1,602,499
PICTURE PROJECTION APPARATUS
Filed Feb. 3, 1926　　2 Sheets-Sheet 2
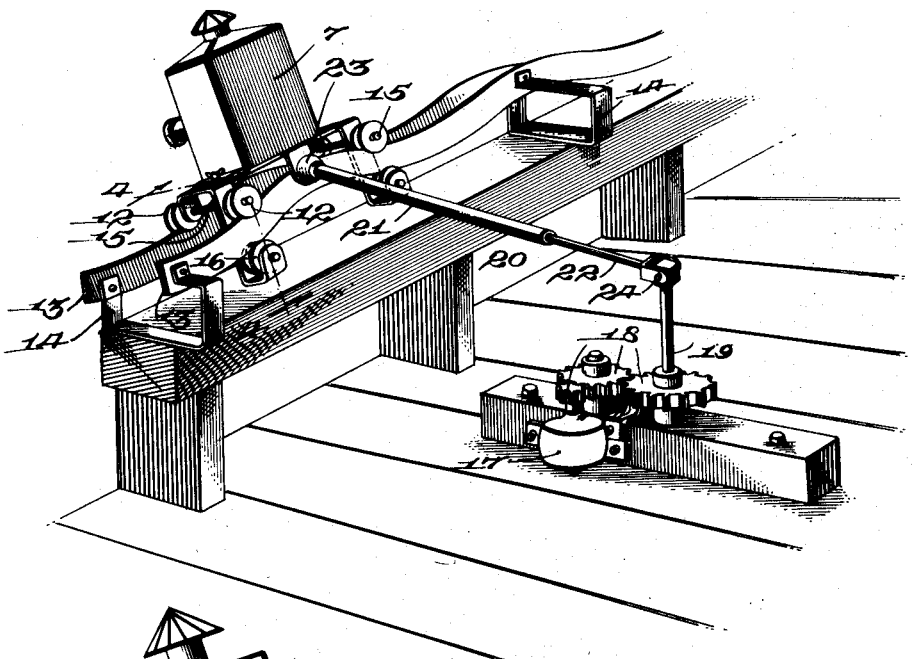
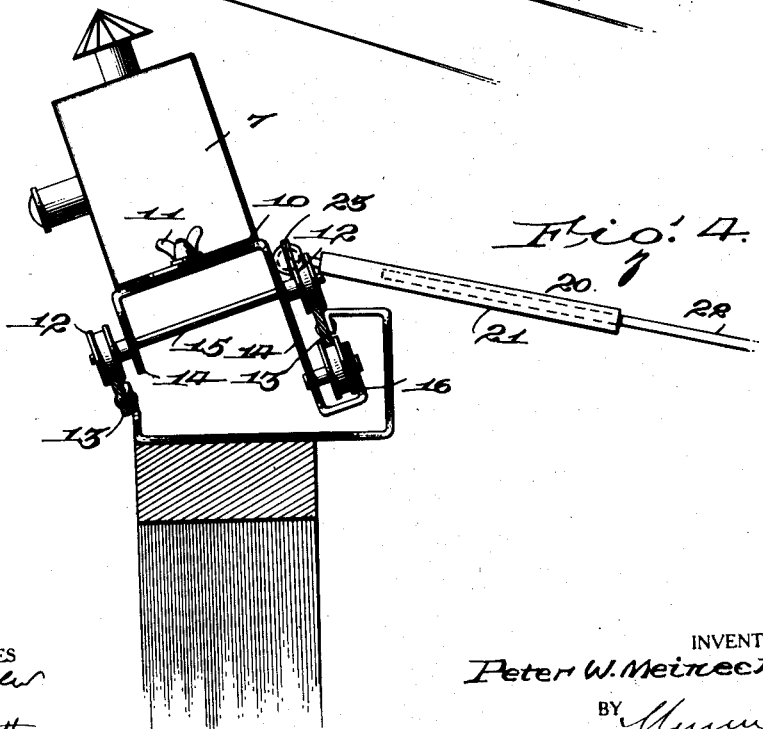
WITNESSES
INVENTOR
Peter W. Meinecke
BY
ATTORNEYS Patented Oct. 12, 1926.

UNITED STATES PATENT OFFICE.

PETER W. MEINECKE, OF SARASOTA, FLORIDA.

PICTURE-PROJECTION APPARATUS.

Application filed February 3, 1926. Serial No. 85,741.

This invention relates to improvements in picture projection apparatus, and an object of the invention is to so incorporate and combine a picture projecting apparatus with a race track as to stimulate the racing instincts of racing animals, for example greyhounds and whippets.

Other objects and advantages appear in the following specification, reference being had to the acompanying drawings, in which—

Figure 3 is a detail perspective view illustrating one way of mounting the projection lantern upon the undulating track.

Figure 4 is a detail cross section taken substantially on the line 4—4 of Figure 3.

Figure 1:
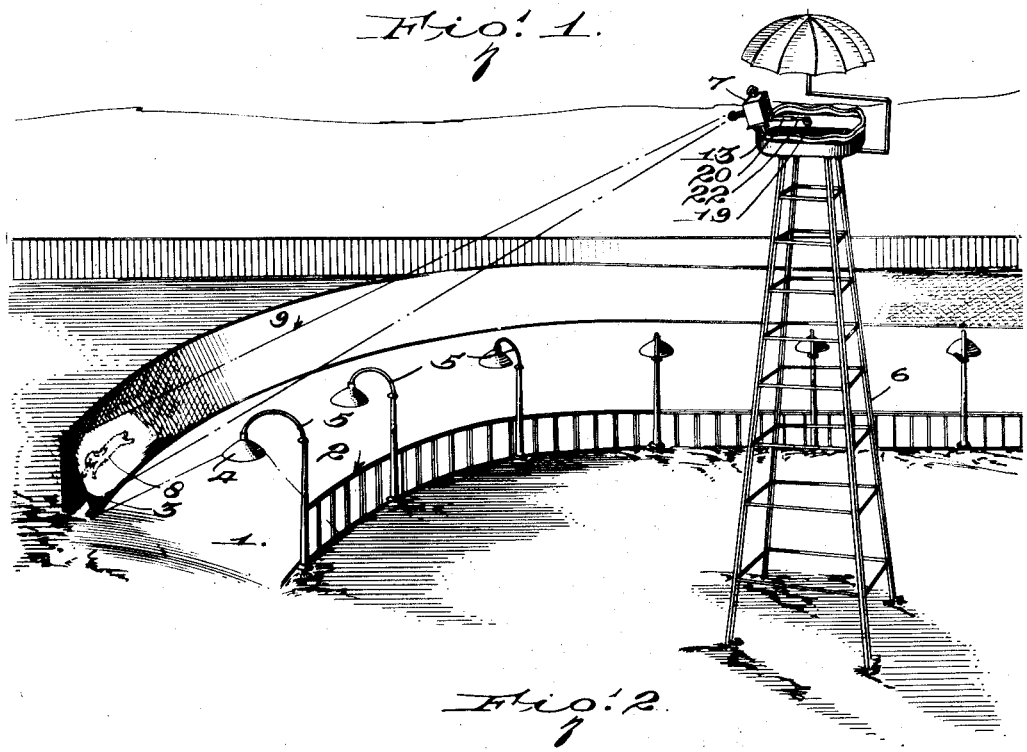
Figure 1 is a perspective view of a fragment of the race track showing how the picture projection apparatus is used in connection therewith.

In order to amplify the foregoing objects of the invention, it may be stated that the improved projection apparatus is intended to be used for throwing a picture of a rabbit, for example, upon a screen that follows the track upon which greyhounds and whippets are starting for racing. The projected picture may either be animated or still, but in either case the projecting lantern is made to travel so that the picture of the rabbit is kept in front of the racing animals. The racing instinct of the animals is thereby stimulated.

Reference is had to the drawing. The race track 1 is of generally oval configuration (Fig. 2), and it may be constructed in any manner usually employed in practice. It may be fenced at 2 on the inside. There is a screen 3 on the outside. This screen stands on an incline and may be composed either of boards painted white, muslin stretched upon a suitable frame or anything else that will serve the purpose of a screen.

It is observed that the screen 3 follows the contour of the race track 1. Although the screen stands at an incline it is sufficiently high to serve the purpose of a fence or guard on the outside of the track. The screen stands in such relationship to the track that the racing animals can keep the projected picture in view, but the particular inclination of the screen will prevent the animals from running up thereupon. In this respect the screen serves as a barrier. This act on the part of the animals might be expected but is not desired.

The race track 1 is illuminated by electric or other lamps which are provided with appropriate shades 4, throwing the light down upon the track 1 but avoiding the screen 3. The light of the electric lamps must not interfere with the projected picture. The electric lamps are not shown, but the reader can readily understand that in practice they are beneath the shades 4. The lamps and shades are carried by standards 5.

Figure 2:
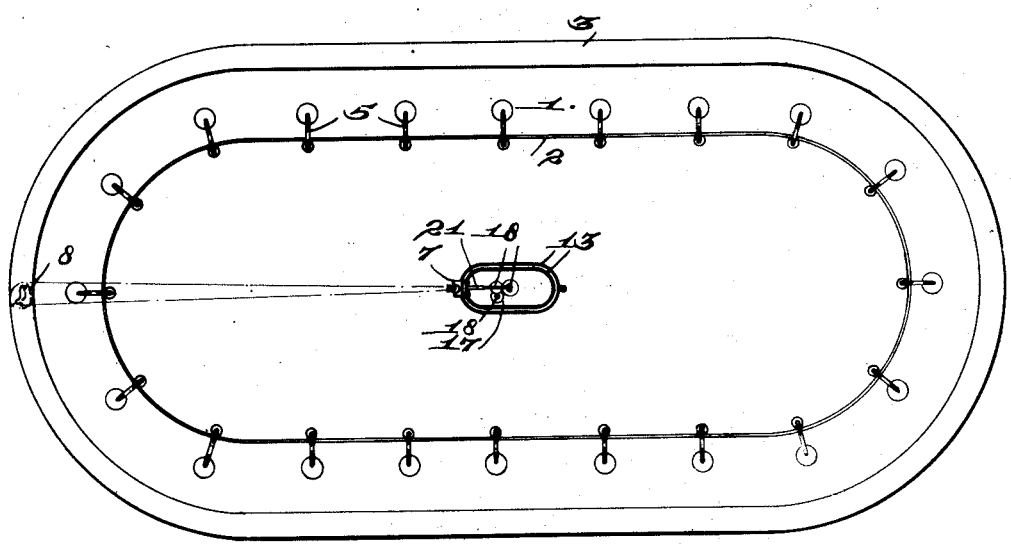
Figure 2 is a detail plan view of the race track, illustrating the location of the screen upon which the picture is projected.

Situated in the substantial center of the race track oval is a tower 6. This tower is centered in the infield as shown in Figure 2. The tower may obviously be of desired type, and the construction thereof may be of metallic or wooden framework.

A lantern 7 (Figs. 1 and 3) projects a picture of a rabbit 8 (Fig. 1) upon the continuous screen 3 by means of the beam of light 9. The light beam is produced by any appropriate means, no attempt being made herein at showing a source of light. However, it is commonly known that picture projectors operate by oil, gas and electric lights and it is deemed sufficient to say that any known mode of illumination can be employed in the lantern or projector 7.

The picture 8 may either be animated or still. In the former instance the projector 7 will be a motion picture machine, in the latter instance it will be a stereopticon. In either case the projector is made to travel a path conforming to the general shape or contour of the screen 3, but on a smaller scale. The projector is mounted upon a carriage 10 (Figs. 3 and 4), to which it is clamped by appropriate means 11. Pairs of preferably flanged wheels 12 ride upon the double rails 13 of the foregoing track. The carriage includes downward projections 14 which carry the axles 15 of the wheels mentioned. The inner projections are somewhat longer (Fig. 4) carrying an extra pair of wheels 16 which run beneath the inner rail 13. The inner rail 13 and the pair of wheels 16 provide a guard which prevents the carriage from riding off of the track.

As stated before, the track conforms with the screen 3 but is on a much smaller scale. This track is mounted on top of the tower 6 (Fig. 1), and the track is of an undulating nature so that the projected picture of the rabbit 8 will appear to be running up and down on the screen 3, thereby simulating the natural actions of the pursued animal.

Any appropriate means may be employed for moving the projector 7 upon its track. One of the means that may be employed consists of an electric or other motor 17 (Fig. 3) which is appropriately geared at 18 with a shaft 19 to which the reach rod 20 is connected. The ratio of the gearing must be such that the picture 8 will traverse the screen 3 at an appropriate speed. It must not travel too fast, and yet fast enough to keep well in front of the pursuing animals.

The reach rod 20 is telescopic in nature, consisting of a sleeve 21 and stem 22. The necessity for the telescopic connection is obvious. The projector track is oval, and the reach rod 20 will therefore have a longer reach as the longitudinal ends of the track are approached. A ball and socket joint 23 forms the connection between the telescopic reach rod and the carriage 10, and the stem 22 has a swivel connection 24 with the upper end of the shaft 19.

The operation is readily understood. The apparatus is employed at night or in an appropriately darkened location where daylight will not interfere with the projected picture 8. As already stated, the screen 3 follows the contour of the race track 1, and stands in such position in relation thereto that the picture 8 may be projected thereupon within view of the racing animals and yet prevent such animals from running up upon the screen in pursuit of the imagined quarry.

The central tower 6 is of such height that the beam of light 9 will pass over the tops of the lamp shades 4 and strike the screen 3 as well illustrated in Figure 1. The race track 1 is illuminated by electric or other lamps (not shown) and the purpose of the shades 4 is to confine the light to the race track, keeping it away from the screen 3.

Upon starting the travel of the projector 7 upon its track, for example by starting the motor 17, the carriage 10 which in this instance has a projector 7, will continuously throw a beam of light and the picture (either animated or still) upon the screen 3. The racing animals seeing the picture will follow in pursuit. The track rails 13 are undulating in nature, giving the projected picture an up and down motion upon the screen, simulating the natural jumping action of a rabbit. It is observed that the rails 13 are inclined in the direction of the screen, that is to say one rail is higher than the other so as to give the projector 7 the necessary slant. The rails may be arranged otherwise, and similarly, the projector may be mounted otherwise and yet be made to throw the beam of light 9 in the desired downward direction. The illustration of the motor 7 implies an electrical mode of moving the projector. The projector may be moved otherwise, for example by hand, but the electrical mode is deemed preferable. It has also been stated that the mode of illumination may be variable, any of the common forms being usable for the purpose of projecting a picture upon the screen 3.

While the construction and arrangement of the improved picture projecting apparatus is that of a generally preferred form, obviously modifications and changes may be made without departing from the spirit of the invention or the scope of the claims.

I claim:—

1. The combination of a race track, a screen disposed continuously along the track, means for projecting a picture upon the screen, and means for moving said projecting means so that the picture traverses the screen in the direction of the length of the race track.

2. The combination of a race track, a screen disposed along one portion thereof, means employing a beam of light for projecting a picture upon the screen, means for moving the projecting means so that the picture traverses the screen in the direction of the length of the track, and means imparting an auxiliary motion to said picture projecting means thereby adding undulations to the motion of the projected picture.

3. The combination of a continuous race track, a continuous screen disposed therealong, means for projecting a picture upon the screen, a carriage upon which the projector is mounted, a track upon which the carriage is movable, conforming in general shape to that of the race track but being on a reduced scale; and means for moving the carriage upon the track causing the projected picture to travel along the screen in the direction of the length of the race track.

4. The combination of a continuous race track, a continuous screen disposed therealong, means for projecting a picture upon the screen, a carriage upon which the projector is mounted, a track upon which the carriage is movable, conforming in general shape to that of the race track but being on a reduced scale, means for moving the carriage upon the track causing the projected picture to travel along the screen in the direction of the length of the race track, and undulations incorporated in the formation of said track giving the track an auxiliary up and down motion with a corresponding motion of the projected picture.

5. The combination of a continuous race track, a continuous screen along the outer edge and shaded lamps along the inner edge, a projector employing a light beam for projecting a picture upon the screen, means centrally located in respect to the race track and at a height sufficient to cause the light beam to pass over the shades and strike the screen, a carriage upon which the projector is mounted, a track carried by the foregoing means upon which the carriage is movable, and means for moving the carriage upon the track causing the picture to travel along the screen in the direction of the length of the race track.

6. Apparatus of the character described comprising a continuous track, means for illuminating the track including shaded lamps disposed along one edge of the race track, and a continuous screen disposed along the other edge of the race track being out of the range of the light from said lamps and being disposed at an inclination in respect to the race track to receive a picture which is projectible thereupon over the tops of said shaded lamps.

7. Apparatus of the character described comprising a picture projector, a carriage upon which the projector is mounted, a continuous track having double rails, pairs of wheels on the carriage running on top of the rails, other pairs of wheels on the carriage running beneath one of the rails thereby constituting a guard, means including a motor driven shaft for operating the carriage, and a reach rod connecting the shaft with the carriage, said reach rod being telescopic to compensate for variations in the length of the track and having freely movable connections at the extremities with the carriage and shaft respectively.

8. The combination of a race track, a continuous screen constituting a barrier along one edge of the track, means for projecting a picture upon the screen, and means for moving said projecting means so that the picture traverses the screen in the direction of the length of the race track.

PETER W. MEINECKE.